United States Patent
Zhao (10) Patent No.: US 10,917,559 B2
(45) Date of Patent: Feb. 9, 2021

(54) METHOD FOR ACHIEVING NON-SELFIE-TAKING EFFECT THROUGH SELFIE-TAKING AND PHOTOGRAPHING DEVICE

(71) Applicant: Huawei Technologies Co., Ltd., Shenzhen (CN)

(72) Inventor: Wenlong Zhao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/343,308

(22) PCT Filed: Oct. 18, 2016

(86) PCT No.: PCT/CN2016/102394
§ 371 (c)(1),
(2) Date: Apr. 18, 2019

(87) PCT Pub. No.: WO2018/072087
PCT Pub. Date: Apr. 26, 2018

(65) Prior Publication Data
US 2019/0320111 A1   Oct. 17, 2019

(51) Int. Cl.
*H04N 5/232* (2006.01)
*G06T 7/70* (2017.01)
(Continued)

(52) U.S. Cl.
CPC .......... *H04N 5/23218* (2018.08); *G06K 9/32* (2013.01); *G06K 9/46* (2013.01); *G06T 7/70* (2017.01);
(Continued)

(58) Field of Classification Search
CPC .......... H04N 5/23218; H04N 5/23219; H04N 5/23222; H04N 5/23229; G06T 7/70;
(Continued)

(56) References Cited

U.S. PATENT DOCUMENTS 9,106,821 B1 * 8/2015 Baldwin ............ H04N 5/23219
9,807,306 B2 * 10/2017 Yu ...................... H04N 5/23293
(Continued)

FOREIGN PATENT DOCUMENTS

CN     102035987 A     4/2011
CN     102420898 A     4/2012
(Continued)

OTHER PUBLICATIONS

Foreign Communication From a Counterpart Application, Chinese Application No. 16919128.5, Extended European Search Report dated Jul. 4, 2019, 7 pages.
(Continued)

*Primary Examiner* — Timothy J Henn
(74) *Attorney, Agent, or Firm* — Conley Rose, P.C.

(57) ABSTRACT

A method for achieving a non-selfie-taking effect through selfie-taking includes displaying indication information on a photographing device. The indication information is used to indicate a placement position and a placement angle of the photographing device. The method includes performing photographing according to the indication information to obtain at least two images. The method includes removing arm part images that are separately included in the at least two images and that are photographed by a user by using the photographing device to obtain at least two remaining images. The method includes stitching the at least two remaining images.

20 Claims, 3 Drawing Sheets

(51) Int. Cl.
*G06K 9/32* (2006.01)
*G06K 9/46* (2006.01)
*G06T 11/60* (2006.01)

(52) U.S. Cl.
CPC ......... *G06T 11/60* (2013.01); *H04N 5/23229* (2013.01)

(58) Field of Classification Search
CPC ........ G06T 11/60; G06K 9/32; G06K 9/3208; G06K 9/46
See application file for complete search history.

(56) References Cited

U.S. PATENT DOCUMENTS

| | | | |
|---|---|---|---|
| 10,477,005 B2* | 11/2019 | Posa | H04N 1/00307 |
| 2009/0268048 A1 | 10/2009 | Matsuno et al. | |
| 2010/0141784 A1 | 6/2010 | Yoo | |
| 2010/0225773 A1* | 9/2010 | Lee | H04N 5/772 348/222.1 |
| 2011/0085060 A1 | 4/2011 | Liu | |
| 2015/0381895 A1 | 12/2015 | Mei-Ling | |
| 2016/0127641 A1 | 5/2016 | Gove | |

FOREIGN PATENT DOCUMENTS

| | | |
|---|---|---|
| CN | 102984452 A | 3/2013 |
| CN | 103685956 A | 3/2014 |
| CN | 103986872 A | 8/2014 |
| CN | 105120157 A | 12/2015 |
| CN | 105139340 A | 12/2015 |
| CN | 105611161 A | 5/2016 |
| CN | 105657257 A | 6/2016 |
| EP | 2339294 A1 | 6/2011 |
| ES | 2551390 A1 | 11/2015 |
| JP | 2006352749 A | 12/2006 |
| WO | 2009064514 A1 | 5/2009 |

OTHER PUBLICATIONS

Machine Translation and Abstract of Chinese Publication No. CN102420898, Apr. 18, 2012, 16 pages.
Machine Translation and Abstract of Chinese Publication No. CN102984452, Mar. 20, 2013, 15 pages.
Machine Translation and Abstract of Chinese Publication No. CN103685956, Mar. 26, 2014, 13 pages.
Machine Translation and Abstract of Chinese Publication No. CN105139340, Dec. 9, 2015, 18 pages.
Machine Translation and Abstract of Chinese Publication No. CN105611161, May 25, 2016, 21 pages.
Machine Translation and Abstract of Spanish Publication No. ES2551390, Nov. 18, 2015, 12 pages.
Foreign Communication From a Counterpart Application, PCT Application No. PCT/CN2016/102394, English Translation of International Search Report dated Jun. 28, 2017, 2 pages.
Foreign Communication From a Counterpart Application, PCT Application No. PCT/CN2016/102394, English Translation of Written Opinion dated Jun. 28, 2017, 3 pages.
Machine Translation and Abstract of Chinese Publication No. CN103986872, Aug. 13, 2014, 15 pages.
Machine Translation and Abstract of Chinese Publication No. CN105120157, Dec. 2, 2015, 26 pages.
Machine Translation and Abstract of Chinese Publication No. CN2006352749, Dec. 28, 2006, 30 pages.
Foreign Communication From a Counterpart Application, Chinese Application No. 201680058424.0, Chinese Office Action dated Jun. 26, 2019, 9 pages.

* cited by examiner

METHOD FOR ACHIEVING NON-SELFIE-TAKING EFFECT THROUGH SELFIE-TAKING AND PHOTOGRAPHING DEVICE

CROSS-REFERENCE TO RELATED APPLICATIONS

This application is a national stage of International Application No. PCT/CN2016/102394, filed on Oct. 18, 2016, which is hereby incorporated by reference in its entirety.

TECHNICAL FIELD

Embodiments of the present invention relate to the field of image processing, and in particular, to a method for achieving a non-selfie-taking effect through selfie-taking and a photographing device.

BACKGROUND

Traveling has become an important part of people's modern life, and photographing is even more essential during traveling. Selfie-taking has currently become increasingly common. In particular, using a selfie stick can achieve a quite good selfie-taking effect. However, during selfie-taking, a person who performs photographing with the selfie stick has only one hand free to pose, and a part of an arm or the selfie stick may be photographed. Therefore, a non-selfie-taking effect cannot be achieved.

An image stitching technology may be used to stitch at least two selfies, so as to achieve a non-selfie-taking effect. The image stitching technology may include an area-based stitching algorithm and a feature-based stitching algorithm. The area-based stitching algorithm is the most conventional and commonest algorithm. The method is performed starting from grayscale values of to-be-stitched images. A difference between grayscale values of an area in a to-be-registered image and an area of a same size in a reference image is calculated by using a least square method or another mathematical method. After the difference is compared, an overlapping area similarity of the to-be-stitched images is determined to obtain a range and a position of an overlapping area of the to-be-stitched images, thereby implementing image stitching. Alternatively, an image may be transformed from time domain to frequency domain through FFT, and then registered. For an image with relatively large displacement, the image may be first rotated, and then a mapping relationship between two images is established. When a difference between grayscale values of pixels in two areas is used as a determining criterion, a simplest method is directly summing grayscale differences of all pixels. In this method, an effect is not quite good, and stitching often fails due to a brightness change, a contrast change, or another reason.

Another method is calculating a correlation coefficient of grayscale values of corresponding pixels in two areas. A larger correlation coefficient indicates a higher matching degree of two images. This method has a better stitching effect and a higher success rate.

In the feature-based registration method, a feature of an image is derived from a pixel instead of directly using a pixel value of the image, and then searching and matching are performed on a corresponding feature area of an overlapping area of the image by using the feature of the image as a criterion. This stitching algorithm has relatively high robustness.

The feature-based registration method has two processes: feature extraction and feature registration. Features such as a point, a line, and an area with an obvious grayscale change are first extracted from two images to form a feature set. Then every effort is made to select, by using a feature matching algorithm, a feature pair with a correspondence from the feature set corresponding to the two images. A series of image segmentation technologies, such as a Canny operator, a Laplace Gaussian operator, and region growing, are used for feature extraction and boundary detection. An extracted spatial feature includes a closed boundary, an open boundary, a cross line, and another feature. There are the following feature matching algorithms: cross correlation, distance transformation, dynamic programming, structure matching, chain code correlation, and the like.

In the foregoing two algorithms, the area-based matching method often has a decreased success rate due to a brightness change or a contrast change, and the feature-based matching algorithm has a better effect, but the algorithm is complex and time-consuming. In other words, the existing image stitching algorithms are more or less limited, which makes image registration difficult. Consequently, an image stitching effect may be unsatisfactory, and a problem such as an image stitching trace can be found.

SUMMARY

Embodiments of the present invention provide a method for achieving a non-selfie-taking effect through selfie-taking and an apparatus.

According to a first aspect, the present invention provides a method for achieving a non-selfie-taking effect through selfie-taking, where the method includes:

displaying indication information on a photographing device, where the indication information is used to indicate a placement position and a placement angle of the photographing device; performing photographing according to the indication information to obtain at least two images; removing arm part images that are separately included in the at least two images and that are photographed by a user by using the photographing device, to obtain at least two remaining images; and stitching the at least two remaining images.

During photographing, the user may determine the position and the angle of the photographing device based on the specific indication information, and then perform photographing to obtain the at least two images. Then the arm parts in which the user holds the photographing device during photographing are removed, and the remaining images are stitched. In this way, the non-selfie-taking effect can be achieved.

With reference to the first aspect, in a first possible implementation of the first aspect, the indication information includes first indication information and second indication information. That, the indication information is used to indicate a placement position and a placement angle of the photographing device may specifically include: the first indication information indicates the placement position of the photographing device, and the second indication information indicates the placement angle of the photographing device. The placement position of the photographing device includes one or a combination of the following positions: a position aligned with a face of a photographed person, a position aligned with a middle of a forehead of the photographed person, and a position aligned with a nose of the photographed person. The photographing position and the photographing angle are determined, so that the user can photograph different images from a same position and a same angle, and then stitching is performed. The same position and the same angle are used, so that an amount of image stitching computation can be reduced. In addition, an image stitching effect can be quite good.

With reference to the first possible implementation of the first aspect, in a second possible implementation of the first aspect, the first indication information is a line segment or a graphic.

The first indication information is set to the line segment or the graphic, so that the user can more accurately determine the placement position of the photographing device when photographing is performed for a plurality of times.

With reference to the first possible implementation of the first aspect or the second possible implementation of the first aspect, in a third possible implementation of the first aspect, that the first indication information indicates the placement position of the photographing device specifically includes:

determining the placement position of the photographing device when the first indication information is aligned with a specified position of the photographed person.

With reference to the first possible implementation of the first aspect, in a fourth possible implementation of the first aspect, that the second indication information indicates the placement angle of the photographing device specifically includes:

determining, according to a first measurement criterion, that placement angles of the photographing device are the same when the photographing device photographs the at least two images.

When the user performs selfie-taking for a plurality of times, the photographing device performs photographing from a same angle, so that an operation count for subsequent image stitching can also be reduced, and an image stitching effect can be better.

According to a second aspect, an embodiment of the present invention provides a photographing device, where the photographing device includes:

a display module, configured to display indication information, where the indication information is used to indicate a placement position and a placement angle of the photographing device; a photographing module, configured to perform photographing according to the indication information to obtain at least two images; and a processing module, configured to: remove arm part images that are separately included in the at least two images and that are photographed by the photographing module, to obtain at least two remaining images; and stitch the at least two remaining images.

When performing photographing by using the photographing device, a user determines the position and the angle of the photographing device according to the indication information displayed by the display module, and then performs photographing by using the photographing module. After the at least two images are obtained, the processing module removes the arm parts in which the user holds the photographing device during photographing, and stitches the remaining images. In this way, a non-selfie-taking effect can be achieved.

With reference to the second aspect, in a first possible implementation of the second aspect, the indication information includes first indication information and second indication information. That the indication information is used to indicate a placement position and a placement angle of the photographing device may specifically include: the first indication information indicates the placement position of the photographing device, and the second indication information indicates the placement angle of the photographing device. The placement position of the photographing device includes one or a combination of the following positions: a position aligned with a face of a photographed person, a position aligned with a middle of a forehead of the photographed person, and a position aligned with a nose of the photographed person. The photographing position and the photographing angle are determined, so that the user can photograph different images from a same position and a same angle, and then stitching is performed. The same position and the same angle are used, so that an amount of image stitching computation can be reduced. In addition, an image stitching effect can be quite good.

With reference to the first possible implementation of the second aspect, in a second possible implementation of the second aspect, the first indication information is a line segment or a graphic.

The first indication information is set to the line segment or the graphic, so that the user can more accurately determine the placement position of the photographing device when photographing is performed for a plurality of times.

With reference to the first possible implementation of the second aspect or the second possible implementation of the second aspect, in a third possible implementation of the second aspect, that the first indication information indicates the placement position of the photographing device specifically includes:

determining the placement position of the photographing device when the first indication information is aligned with a specified position of the photographed person.

With reference to the first possible implementation of the second aspect, in a fourth possible implementation of the second aspect, that the second indication information indicates the placement angle of the photographing device specifically includes:

determining, according to a first measurement criterion, that placement angles of the photographing device are the same when the photographing device photographs the at least two images.

When the user performs selfie-taking for a plurality of times, the photographing device performs photographing from a same angle, so that an operation count for subsequent image stitching can also be reduced, and an image stitching effect can be better.

According to a third aspect, an embodiment of the present invention provides a photographing device, where the photographing device includes:

a display, configured to display indication information, where the indication information is used to indicate a placement position and a placement angle of the photographing device; a camera module, configured to perform photographing according to the indication information to obtain at least two images; and a processor, configured to: remove arm part images that are separately included in the at least two images and that are photographed by the camera module, to obtain at least two remaining images; and stitch the at least two remaining images.

When performing photographing by using the photographing device, a user determines the position and the angle of the photographing device according to the indication information displayed by the display, and then performs photographing by using the camera module. After the at least two images are obtained, the processor removes the arm parts in which the user holds the photographing device during photographing, and stitches the remaining images. In this way, a non-selfie-taking effect can be achieved. With reference to the third aspect, in a first possible implementation of the third aspect, the indication information includes first indication information and second indication information. That the indication information is used to indicate a placement position and a placement angle of the photographing device may specifically include: the first indication information indicates the placement position of the photographing device, and the second indication information indicates the placement angle of the photographing device. The placement position of the photographing device includes one or a combination of the following positions: a position aligned with a face of a photographed person, a position aligned with a middle of a forehead of the photographed person, and a position aligned with a nose of the photographed person.

The photographing position and the photographing angle are determined, so that the user can photograph different images from a same position and a same angle, and then stitching is performed. The same position and the same angle are used, so that an amount of image stitching computation can be reduced. In addition, an image stitching effect can be quite good.

With reference to the first possible implementation of the third aspect, in a second possible implementation of the third aspect, the first indication information is a line segment or a graphic.

The first indication information is set to the line segment or the graphic, so that the user can more accurately determine the placement position of the photographing device when photographing is performed for a plurality of times.

With reference to the first possible implementation of the third aspect or the second possible implementation of the third aspect, in a third possible implementation of the third aspect, that the first indication information indicates the placement position of the photographing device specifically includes:

determining the placement position of the photographing device when the first indication information is aligned with a specified position of the photographed person.

With reference to the first possible implementation of the third aspect, in a fourth possible implementation of the third aspect, that the second indication information indicates the placement angle of the photographing device specifically includes:

determining, according to a first measurement criterion, that placement angles of the photographing device are the same when the photographing device photographs the at least two images.

When the user performs selfie-taking for a plurality of times, the photographing device performs photographing from a same angle, so that an operation count for subsequent image stitching can also be reduced, and an image stitching effect can be better.

Based on the foregoing technical solutions, according to the method for achieving a non-selfie-taking effect through selfie-taking provided in the embodiments of the present invention, the user can separately take at least two selfies by using two hands. During photographing, the placement position and the placement angle of the photographing device are first determined according to the indication information. Then selfie-taking is separately performed by using the two hands to obtain the at least two images, and image stitching is performed. During image stitching, placement positions and placement angles of a camera are basically the same whenever photographing is performed. Therefore, during obtaining of registration control points, corresponding coordinate positions of the registration control points are basically the same. In this way, an amount of image stitching computation is reduced, image stitching is easier to implement, and an image stitching effect is better.

DESCRIPTION OF EMBODIMENTS

The following further describes the technical solutions of the present invention in detail with reference to the accompanying drawings and the embodiments.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention.

The embodiments of the present invention are mainly used to resolve problems that a user can have only one hand free to pose during selfie-taking, a selfie stick is likely to be photographed during selfie-taking, and the like, avoid problems that an obvious stitching trace exists when image stitching is performed on a plurality of selfies, and the like, and achieve a non-selfie-taking effect after image stitching is performed on the plurality of selfies. To achieve the foregoing objectives, the embodiments of the present invention provide a method for achieving a non-settle-taking effect through selfie-taking. During photographing, a user is guided to use a better photographing manner, to ensure that photographing positions and photographing angles are basically the same whenever photographing is performed, so that positions of registration control points in photographed images are basically the same. In this way, an amount of image stitching computation is greatly reduced, and image stitching is easier to implement.

Figure 1:
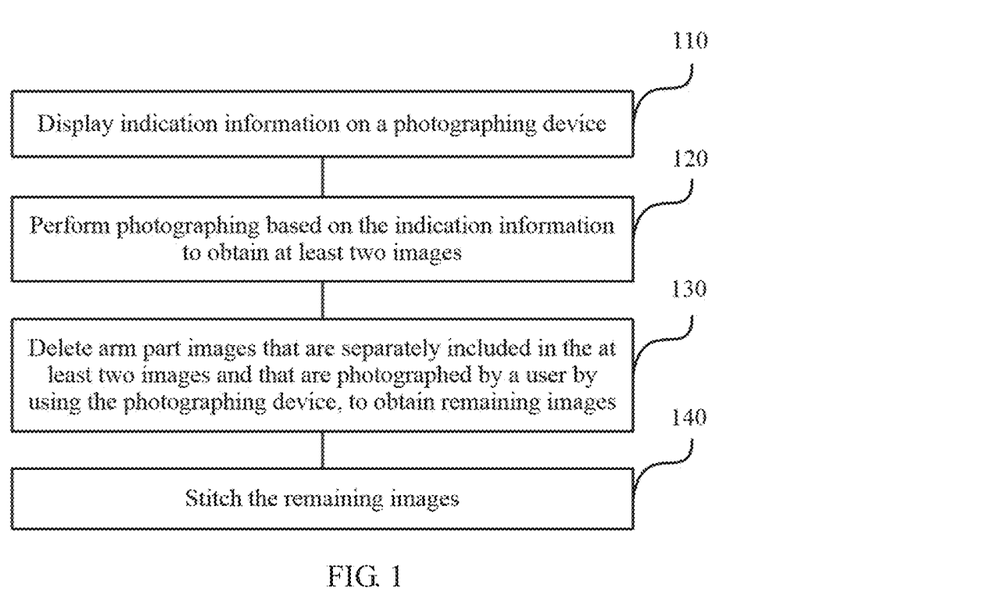
FIG. 1 is a schematic flowchart of a method for achieving a non-selfie-taking effect through selfie-taking according to Embodiment 1 of the present invention.

A specific method flowchart is shown in FIG. 1. FIG. 1 is a schematic flowchart 100 of a method for achieving a non-selfie-taking effect through selfie-taking according to Embodiment 1 of the present invention.

S110. Display indication information on a photographing device.

Specifically, the indication information is mainly used to indicate a placement position and a placement angle of the photographing device.

Optionally, the indication information may include first indication information and second indication information. The first indication information is used to indicate the placement position of the photographing device, and the second indication information is used to indicate the placement angle of the photographing device.

When a user starts the photographing device to perform photographing, the photographing device first automatically identifies a position of the user, and displays the first indication information on the photographing device. The first indication information is used to indicate the placement position of the photographing device. For example, the placement position of the photographing device may include one or a combination of the following positions: a position aligned with a whole face of a photographed person, a position aligned with a middle of a forehead of the photographed person, a position aligned with a nose of the photographed person, and the like. Certainly, the placement position of the photographing device may be another reference position, such as a position aligned with a middle of lips of the photographed person.

Figure 2:
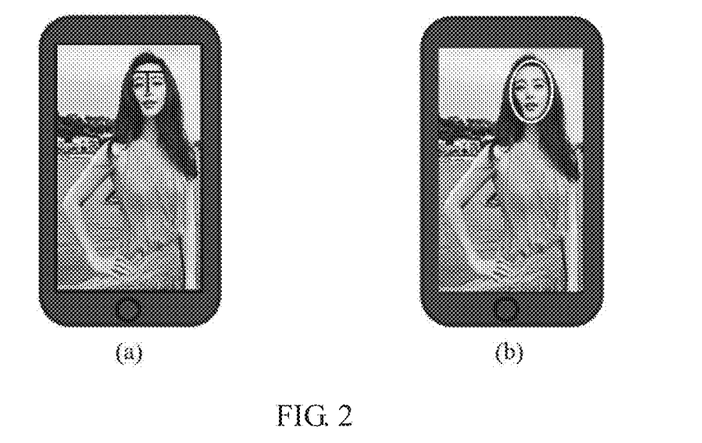
FIG. 2 is a schematic diagram of indicating a placement position of a photographing device by using first indication information according to an embodiment of the present invention.

When the photographing device prepares to perform photographing, the first indication information displayed on the photographing device may be a simple line segment or a simple shape, and is used to instruct the user to place the photographing device in a position. In this case, the line segment or the shape displayed on the photographing device is exactly aligned with a specific position of the user. For example, the first indication information may be a T-shaped line segment shown in FIG. 2 (a). A horizontal line part of the T-shaped line segment is aligned with a position of a middle of a forehead of a person, and a vertical line part is aligned with a nose of the person. When the T-shaped line segment is aligned with the forehead and the nose of the person, the placement position of the photographing device is determined. Alternatively, the first indication information may be an oval circle shown in FIG. 2 (b). During photographing, when a whole face of a person falls within the oval circle, it indicates that the placement position of the photographing device is determined.

Figure 3:
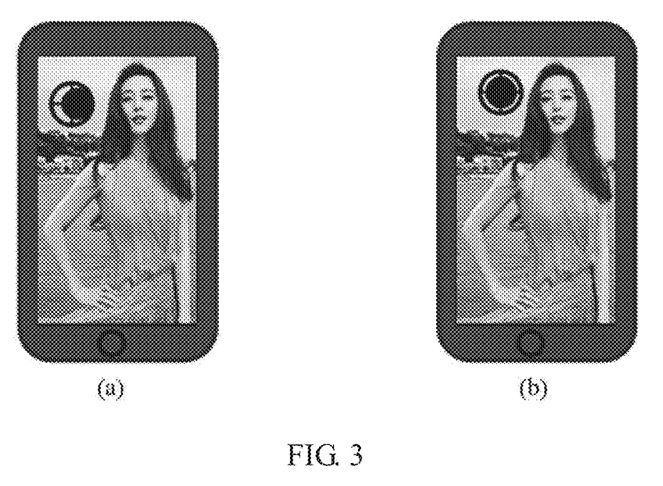
FIG. 3 is a schematic diagram of indicating a placement angle of a photographing device by using second indication information according to an embodiment of the present invention.

If displaying the first indication information means adjusting the position of the photographing device from a macroscopic perspective, displaying the second indication information may mean adjusting the placement angle of the photographing device from a microscopic perspective. Finally, according to the indication information, images can be photographed from an approximately same position and an approximately same angle, so that subsequent image stitching processing is easier. Another reason for adjusting the placement angle of the photographing device is as follows: If a position of a camera is placed according to the first indication information, but an angle of the camera is not adjusted and photographing is performed from a random angle when the user performs photographing with one hand, a photographing angle can hardly be the same as that for the first time of photographing even though the position of the camera can be determined when the user performs photographing with the other hand. Therefore, after the position of the photographing device is placed according to the first indication information, the placement angle of the photographing device further needs to be placed based on the second indication information. A specific execution process includes the following:

It is determined, according to a first measurement criterion, that placement angles of the photographing device are the same when the photographing device photographs at least two images. The first measurement criterion may be shown in FIG. 3: When a circle in an icon is not in a center of a cross (as shown in FIG. 3 (a)), it indicates that the placement angle of the photographing device needs to be slightly adjusted. When the circle in the icon is in the center of the cross (as shown in FIG. 3 (b)), it indicates that the adjustment to the placement angle of the photographing device is completed, and photographing can be performed.

For example, when the photographing device is a mobile phone, an angle between a placement position of the mobile phone and a horizontal may be determined based on a gravitational acceleration by using an acceleration sensor of the mobile phone. If the acceleration sensor is a tri-axis acceleration sensor, a 1 g gravitational acceleration is detected in a still state. Then the acceleration is allocated to three axes x, y, and z to obtain different values, and relative angles between the three axes and the horizontal can be learned through calculation. A specific principle is as follows: The tri-axis acceleration sensor determines a posture of an object in space by using gravity as an input vector. The acceleration sensor is fastened on a horizontal plane of the object. When the posture of the object changes, a sensitive axis of the acceleration sensor rotates at a specific angle accordingly. Due to the gravity, an acceleration of the sensitive axis of the sensor changes. Therefore, a change of the posture of the object can be reflected by measuring a change of the acceleration. When the mobile phone rotates in a horizontal direction, values obtained by the acceleration sensor of the mobile phone are the same. In this case, a function of the acceleration sensor is not quite obvious. Therefore, a gyroscope is required to determine a rotation angle of the mobile phone in the horizontal direction. The acceleration sensor and the gyroscope are jointly used to finally determine a placement angle of the mobile phone. When the placement angle of the mobile phone during photographing is preset in the mobile phone, the display mode mentioned above is used During photographing, provided that the circle in the icon is in the center of the cross, it indicates that the placement angle of the mobile phone is determined, and photographing can be performed.

After the photographing device is adjusted by using the foregoing method and photographing is performed at least twice, at least two selfies can be obtained.

Step 120: Remove arm part images that are separately included in at least two images and that are photographed by a user by using the photographing device, to obtain at least two remaining images.

Specifically, the present invention is intended to achieve a non-selfie-taking effect by stitching selfies. Therefore, before image stitching, the arm part images that exist in the two selfies when the user performs selfie-taking need to be separately removed, and the at least two remaining images are obtained.

Step 130: Stitch the at least two remaining images.

Specifically, a process of stitching the at least two remaining images obtained after the arm part images that are photographed by using the photographing device are removed may include: extracting feature points from the at least two remaining images, and matching these feature points. In a narrow sense, the image feature points may include an angle point, a crosspoint, and the like. The extracted feature points are registered. Finally, the at least two images are fused. In this way, the non-selfie-taking effect can be achieved. During image stitching, an amount of image stitching computation can be greatly reduced, and an image stitching effect can be quite good. In the prior art, an image stitching algorithm (including feature point extraction, image registration, image fusion, and the like) is quite mature, and details are not described herein.

According to the method for achieving a non-selfie-taking effect through selfie-taking provided in Embodiment 1 of the present invention, the user can separately take at least two selfies by using two hands. During photographing, the placement position and the placement angle of the photographing device are first determined according to the indication information. Then selfie-taking is separately performed by using the two hands to obtain at least two images, and image stitching is performed. During image stitching, images in which the hand holds the camera are first deleted, and then remaining images are stitched. In addition, placement positions and placement angles of the camera are basically the same whenever photographing is performed. Therefore, during obtaining of registration control points, corresponding coordinate positions of the registration control points are basically the same. In this way, an amount of image stitching computation is reduced, image stitching is easier to implement, and an image stitching effect is better.

Figure 4:
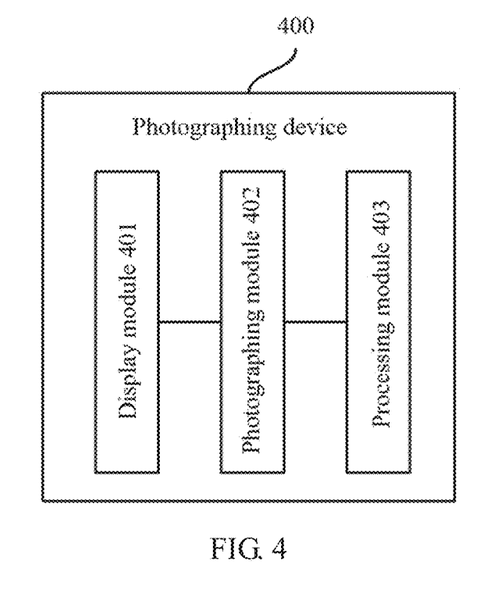
FIG. 4 is a schematic structural diagram of a photographing device according to Embodiment 2 of the present invention.

In addition, corresponding to the method for achieving a non-selfie-taking effect through selfie-taking provided in Embodiment 1 of the present invention, a photographing device is provided in Embodiment 2 of the present invention. Specifically, as shown in FIG. 4, FIG. 4 is a schematic structural diagram 400 of the photographing device. The photographing device includes a display module 401, a photographing module 402, and a processing module 403.

The display module 401 is configured to display indication information. The indication information is used to indicate a placement position and a placement angle of the photographing device.

Optionally, the indication information may include first indication information and second indication information. The first indication information indicates the placement position of the photographing device. The first indication information may be a line segment or a graphic. The second indication information is used to indicate the placement angle of the photographing device. A manner in which the second indication information indicates the placement angle of the photographing device may include: determining, according to a first measurement criterion, that placement angles of the photographing device are the same when the photographing device photographs at least two images. Herein the first measurement criterion may be shown in FIG. 3: When a circle in an icon is not in a center of a cross (as shown in FIG. 3 (a)), it indicates that the placement angle of the photographing device needs to be slightly adjusted. When the circle in the icon is in the center of the cross (as shown in FIG. 3 (b)), it indicates that the adjustment to the placement angle of the photographing device is completed, and photographing can be performed.

The placement position of the photographing device may include one or a combination of the following: a position aligned with a face of a photographed person, a position aligned with a middle of a forehead of the photographed person, a position aligned with a nose of the photographed person, and the like.

After the specific placement position and the specific placement angle of the photographing device are determined, the photographing module 402 is configured to perform photographing according to the indication information to obtain at least two images.

The processing module 403 is configured to: remove arm part images that are separately included in the at least two images and that are photographed by the photographing module, to obtain at least two remaining images; and stitch the at least two remaining images.

Functions that can be implemented by the function modules of the photographing device in Embodiment 2 of this application may be implemented by performing the steps in the foregoing method embodiment, Therefore, a specific working process of the photographing device provided in this application is not described herein again.

According to the photographing device provided in Embodiment 2 of the present invention, the placement position and the placement angle of the photographing device are first determined according to the indication information. Then the photographing module performs photographing to obtain the at least two images. The processing module performs image stitching. During image stitching, images in which a hand holds a camera are first deleted, and then remaining images are stitched. In addition, placement positions and placement angles of the camera are basically the same whenever photographing is performed. Therefore, during obtaining of registration control points, corresponding coordinate positions of the registration control points are basically the same. In this way, an amount of image stitching computation is reduced, image stitching is easier to implement, and an image stitching effect is better.

Figure 5:
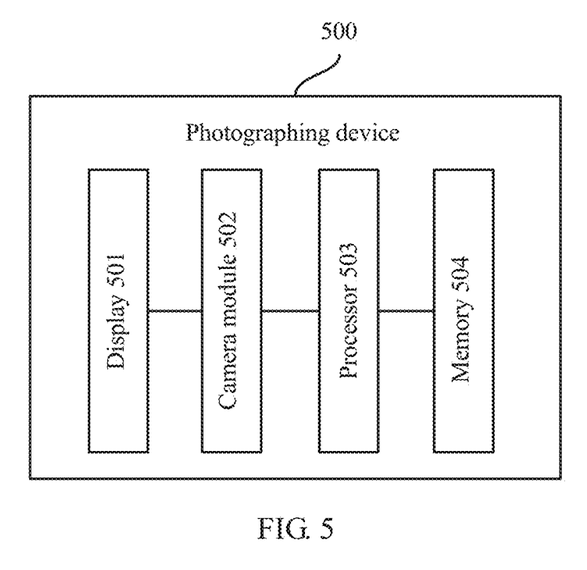
FIG. 5 is a schematic structural diagram of a photographing device according to Embodiment 3 of the present invention.

Embodiment 3 of the present invention provides a photographing device 500. Specifically, as shown in FIG. 5, the photographing device includes a display 501, a camera module 502, and a processor 503.

The display 501 is configured to display indication information on the photographing device. The indication information is used to indicate a placement position and a placement angle of the photographing device.

Specifically, the indication information may include first indication information and second indication information. The first indication information indicates the placement position of the photographing device. The first indication information may be a line segment or a graphic.

The second indication information is used to indicate the placement angle of the photographing device.

A manner in which the second indication information indicates the placement angle of the photographing device may include: determining, according to a first measurement criterion, that placement angles of the photographing device are the same when the photographing device photographs at least two images. Herein the first measurement criterion may be shown in FIG. 3: When a circle in an icon is not in a center of a cross (as shown in FIG. 3 (a)), it indicates that the placement angle of the photographing device needs to be slightly adjusted. When the circle in the icon is in the center of the cross (as shown in FIG. 3 (b)), it indicates that the adjustment to the placement angle of the photographing device is completed, and photographing can be performed.

The placement position of the photographing device may include one or a combination of the following: a position aligned with a face of a photographed person, a position aligned with a middle of a forehead of the photographed person, a position aligned with a nose of the photographed person, and the like.

After the specific placement position and the specific placement angle of the photographing device are determined, the camera module 502 is configured to perform photographing according to the indication information to obtain at least two images.

The processor 503 is configured to: remove arm part images that are separately included in the at least two images and that are photographed by the camera module 502, to obtain at least two remaining images; and stitch the at least two remaining images. The processor 503 may be a central processing unit (English: central processing unit, CPU for short).

In addition, the photographing device further includes a memory 504. The memory 504 may include a volatile memory (English: volatile memory), for example, a random access memory (English: random-access memory, RAM for short). The memory may further include a non-volatile memory (English: non-volatile memory), for example, a read-only memory (English: read-only memory, ROM for short), flash memory, a hard disk (English: hard disk drive, HDD for short), or a solid state drive (English: solid state drive, SSD for short). The memory 504 may further include a combination of the foregoing types of memories.

The memory 504 is mainly configured to store one or more programs. The one or more programs are used to perform functional steps that can be implemented by the processor. In addition, the memory is further configured to store the at least two images photographed by a user by using the photographing device and an image obtained after the processor 503 performs image stitching. Optionally, the processor 503 may further remove the arm part images that are separately included in the at least two images and that are photographed by the camera module, to obtain the at least two remaining images.

Functions that can be implemented by the components of the photographing device in Embodiment 3 of this application may be implemented by performing the steps in the method for achieving a non-selfie-taking effect through selfie-taking in Embodiment 1. Therefore, a specific working process of the photographing device provided in this application is not described herein again. According to the photographing device provided in Embodiment 3 of the present invention, the placement position and the placement angle of the photographing device are first determined according to the indication information. Then the camera module performs photographing to obtain the at least two images. The processor performs image stitching. During image stitching, images in which a hand holds a camera are first deleted, and then remaining images are stitched. In addition, placement positions and placement angles of the camera are basically the same whenever photographing is performed. Therefore, during obtaining of registration control points, corresponding coordinate positions of the registration control points are basically the same. In this way, an amount of image stitching computation is reduced, image stitching is easier to implement, and an image stitching effect is better.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A method for achieving a non-selfie-taking effect through selfie-taking, wherein the method is performed by a photographing device, and wherein the method comprises:
    displaying, on the photographing device, first indication information that indicates a first placement position of the photographing device;
    displaying, on the photographing device, second indication information that identifies a first current placement angle of the photographing device;
    performing photographing according to the first indication information and the second indication information to obtain a first image;
    displaying, on the photographing device, third indication information that indicates a second placement position of the photographing device;
    displaying, on the photographing device, fourth indication information that identifies a second current placement angle of the photographing device;
    determining whether the first current placement angle is the same as the second current placement angle;
    performing photographing according to the third indication information and the fourth indication information to obtain a second image responsive to the first current placement angle being the same as the second current placement angle;
    removing parts of the first image and the second image that include at least a portion of one or more hands or arms of a user to obtain at least two remaining images; and
    stitching the at least two remaining images.

2. The method of claim 1, wherein the first placement position of the photographing device comprises one or more of a position aligned with a face of a photographed person, a position aligned with a middle of a forehead of the photographed person, or a position aligned with a nose of the photographed person.

3. The method of claim 2, wherein the first indication information is a line segment or a graphic.

4. The method of claim 3, further comprising determining that the first placement position of the photographing device is achieved when the first indication information is aligned with a specified position of the photographed person.

5. The method of claim 2, further comprising determining that the first placement position of the photographing device is achieved when the first indication information is aligned with a specified position of the photographed person.

6. The method of claim 2, further comprising determining, according to a first measurement criterion, that the first current placement angle and the second current placement angle are the same, wherein the first measurement criterion corresponds to whether a circle in an icon is in a center of a cross.

7. The method of claim 1, wherein the first placement position of the photographing device comprises a position aligned with a face of a photographed person.

8. The method of claim 1, wherein the first placement position of the photographing device comprises a position aligned with a middle of a forehead of a photographed person.

9. A photographing device, comprising:
a display configured to:
display first indication information that indicates a first placement position of the photographing device;
display second indication information that identifies a first current placement angle of the photographing device;
display third indication information that indicates a second placement position of the photographing device; and
display fourth indication information that identifies a second current placement angle of the photographing device;
a camera configured to perform photographing according to the first indication information and the second indication information to obtain a first image; and
a processor coupled to the display and the camera and configured to determine whether the first current placement angle is the same as the second current placement angle,
wherein the camera is further configured to perform photographing according to the third indication information and the fourth indication information responsive to the first current placement angle being the same as the second current placement angle to obtain a second image, and
wherein the processor is further configured to:
remove parts of the first image and the second image that include at least a portion of one or more hands or arms of a user to obtain at least two remaining images; and
stitch the at least two remaining images.

10. The photographing device of claim 9, wherein the first placement position of the photographing device comprises one or more of a position aligned with a face of a photographed person, a position aligned with a middle of a forehead of the photographed person, or a position aligned with a nose of the photographed person.

11. The photographing device of claim 10, wherein the first indication information is a line segment or a graphic.

12. The photographing device of claim 11, further comprising determining that the first placement position of the photographing device is achieved when the first indication information is aligned with a specified position of the photographed person.

13. The photographing device of claim 10, wherein the processor is further configured to determine that the first placement position of the photographing device is achieved when the first indication information is aligned with a specified position of the photographed person.

14. The photographing device of claim 10, wherein the processor is further configured to determine, according to a first measurement criterion, that the first current placement angle and the second current placement angle are the same, and wherein the first measurement criterion corresponds to whether a circle in an icon is in a center of a cross.

15. A non-transitory computer-readable storage medium storing at least one instruction that, when executed by a photographing device, causes the photographing device to:
display, on the photographing device, first indication information that indicates a first placement position of the photographing device;
display, on the photographing device, second indication information that indicates a first placement angle of the photographing device;
perform photographing according to the first indication information and the second indication information to obtain a first image;
display, on the photographing device, third indication information that indicates a second placement position of the photographing device;
display, on the photographing device, fourth indication information that identifies a second current placement angle of the photographing device;
determine whether the first placement angle is the same as the second placement angle;
perform photographing according to the third indication information and the fourth indication information to obtain a second image responsive to the first placement angle being the same as the second placement angle;
remove parts of the first image and the second image that include at least a portion of one or more hands or arms of a user to obtain at least two remaining images; and
stitch the at least two remaining images.

16. The non-transitory computer-readable storage medium of claim 15, wherein the first placement position of the photographing device comprises one or more of a position aligned with a face of a photographed person, a position aligned with a middle of a forehead of the photographed person, or a position aligned with a nose of the photographed person.

17. The non-transitory computer-readable storage medium of claim 16, wherein the first indication information is a line segment or a graphic.

18. The non-transitory computer-readable storage medium of claim 16, wherein the at least one instruction further causes the photographing device to determine that the first placement position of the photographing device is achieved when the first indication information is aligned with a specified position of the photographed person.

19. The non-transitory computer-readable storage medium of claim 16, wherein the at least one instruction further causes the photographing device to determine that the second placement position of the photographing device is achieved when the third indication information is aligned with a specified position of the photographed person.

20. The non-transitory computer-readable storage medium of claim 16, wherein the at least one instruction further causes the photographing device to determine, according to a first measurement criterion, that the first current placement angle and the second current placement angle are the same, wherein the first measurement criterion corresponds to whether a circle in an icon is in a center of a cross.

* * * * *